United States Patent [19]

Portmann

[11] 4,068,295
[45] Jan. 10, 1978

[54] VOLTAGE MULTIPLIER FOR AN ELECTRONIC TIME APPARATUS

[75] Inventor: Hubert Portmann, Colombier, Switzerland

[73] Assignee: Ebauches S.A., Neuchagel, Switzerland

[21] Appl. No.: 702,490

[22] Filed: July 6, 1976

[30] Foreign Application Priority Data

Aug. 14, 1975 Switzerland .................. 10575/75

[51] Int. Cl.² .................. H02M 7/25; G04C 3/00
[52] U.S. Cl. .................. 363/60; 58/23 BA; 363/147
[58] Field of Search .......... 321/15; 58/23 R, 23 BA, 58/50 A; 307/110; 363/60, 61, 147

[56] References Cited

U.S. PATENT DOCUMENTS

| 3,790,812 | 2/1974 | Fry | 321/15 |
| 3,824,447 | 7/1974 | Kuwabara | 307/110 |
| 3,944,908 | 3/1976 | Oki | 321/15 |
| 4,001,664 | 1/1977 | Hyltin | 321/15 |
| 4,015,420 | 4/1977 | Walker | 58/23 BA |

FOREIGN PATENT DOCUMENTS 2,530,870  2/1976  Germany .................. 58/23 BA

OTHER PUBLICATIONS

IEEE Journal of Solid–State Circuits, vol. SC-11, No. 3, pp. 374-378, June 1976.

Primary Examiner—William H. Beha, Jr.
Attorney, Agent, or Firm—Imirie, Smiley & Guay

[57] ABSTRACT

A voltage multiplier for an electronic time-measuring apparatus comprising cells, each of which including two capacitors, a pair of complementary field-effect transistors (FET'S) acting as switches, and an inverter comprising a pair of FET'S. The elements of the cells are such that they are capable of being integrated together with the rest of the circuit of the time-measuring apparatus.

The voltage to be increased is fed via a first capacitor to the first pair of FETS'S and at the same time to the input of the inverter whose output drives with the correct phase the first pair of FETS'S, which alternatively switches the input signal to a common point of the cell and to an output terminal of the cell, thus charging a second capacitor with the opposite polarity than that of the input signal respective to the common point of the cell. In order for the input voltage to be further increased, the cells can be cascaded in a chain, the common point of one cell being connected to the output terminal of the preceding cell. Each cell will add to the preceding one an amount of voltage equal to that of the input voltage.

5 Claims, 9 Drawing Figures

FIG. 1 PRIOR ART
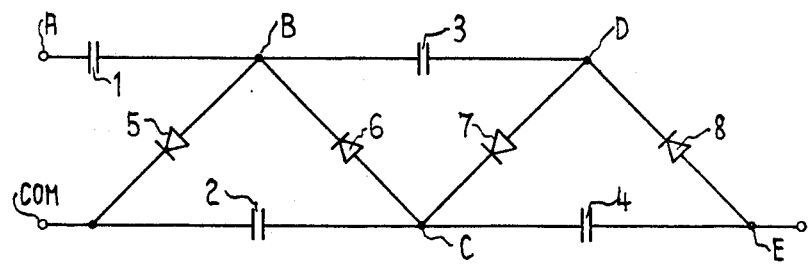
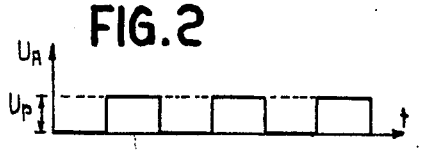
FIG. 2
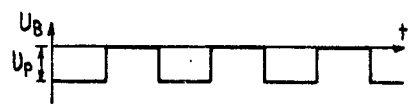
FIG. 3
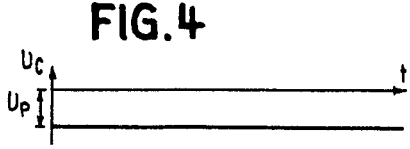
FIG. 4
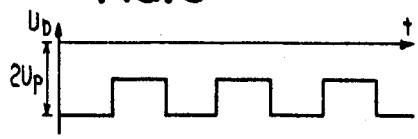
FIG. 5
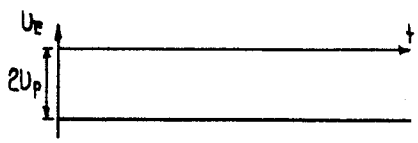
FIG. 6
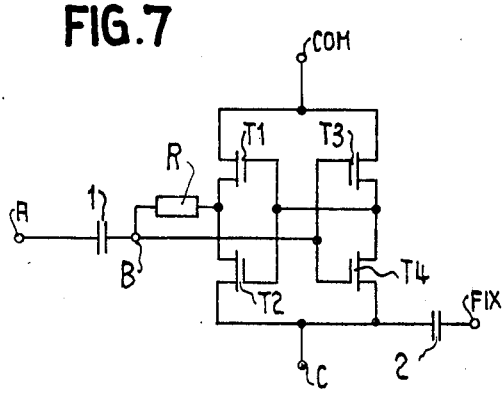
FIG. 7
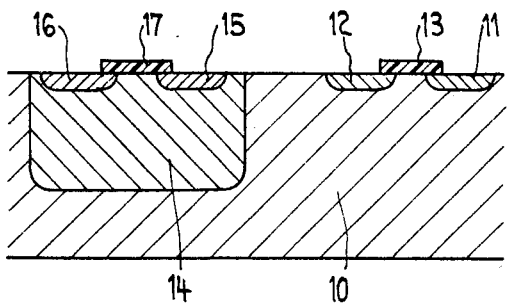
FIG. 8

VOLTAGE MULTIPLIER FOR AN ELECTRONIC TIME APPARATUS

The present invention relates to a voltage multiplier for electronic time apparatus.

Entirely electronic watches (called "solid-state") need, for feeding their display, a voltage which is greater than the cell voltage. There are known and presently used voltage converters in the form of transformers or of simple inductances. The use of these elements presents certain disadvantages the transformer is a relatively large and particularly expensive element, the number of its outputs is high and its magnetic circuit must be well shielded so as not to disturb the rest of the circuit. The use of an inductance, on the other hand, necessitates an adjustment of the output voltage and it is then necessary to find a Zener diode having the correct characteristics or alternatively it is necessary to adjust a resistance.

The invention has for its object to seek to provide a voltage multiplier device precluding the above-mentioned faults. Its power level must be of the order of microwatts, its output voltage must be very stable and little dependent of the charge at its output. The elements of which it is composed, finally, should be capable of being made by means of the same fabrication technique as the rest of the circuit of the time apparatus. The time circuit and the multiplier should thus be capable of being integrated together on the same base.

According to the present invention there is provided a voltage multiplier for an electronic time apparatus comprising at least one cell including a first capacitor transmitting an input signal to two complimentary field effect transistors which transmit the input signal alternatively to a common point of the cell and to an output terminal of the cell, the said transistors being controlled by a reverser also controlled by the signal transmitted to the transistors and fed by the voltage appearing at the common point and at the output terminal of the cell, a second capacitor being connected between the output terminal and a stable voltage point.

The present invention will be described further, by way of example, with reference to the accompanying drawings, in which:

FIG. 1 is a diagram illustrating the configuration of a known voltage converter;

FIGS. 2–6 are diagrams illustrating the functioning of the device shown in FIG. 1;

FIG. 7 shows a cell of a voltage multiplier in accordance with the present invention;

FIG. 8 shows schematically, in section, the construction of the transistors used in the voltage multiplier of the invention.

Figure 9:
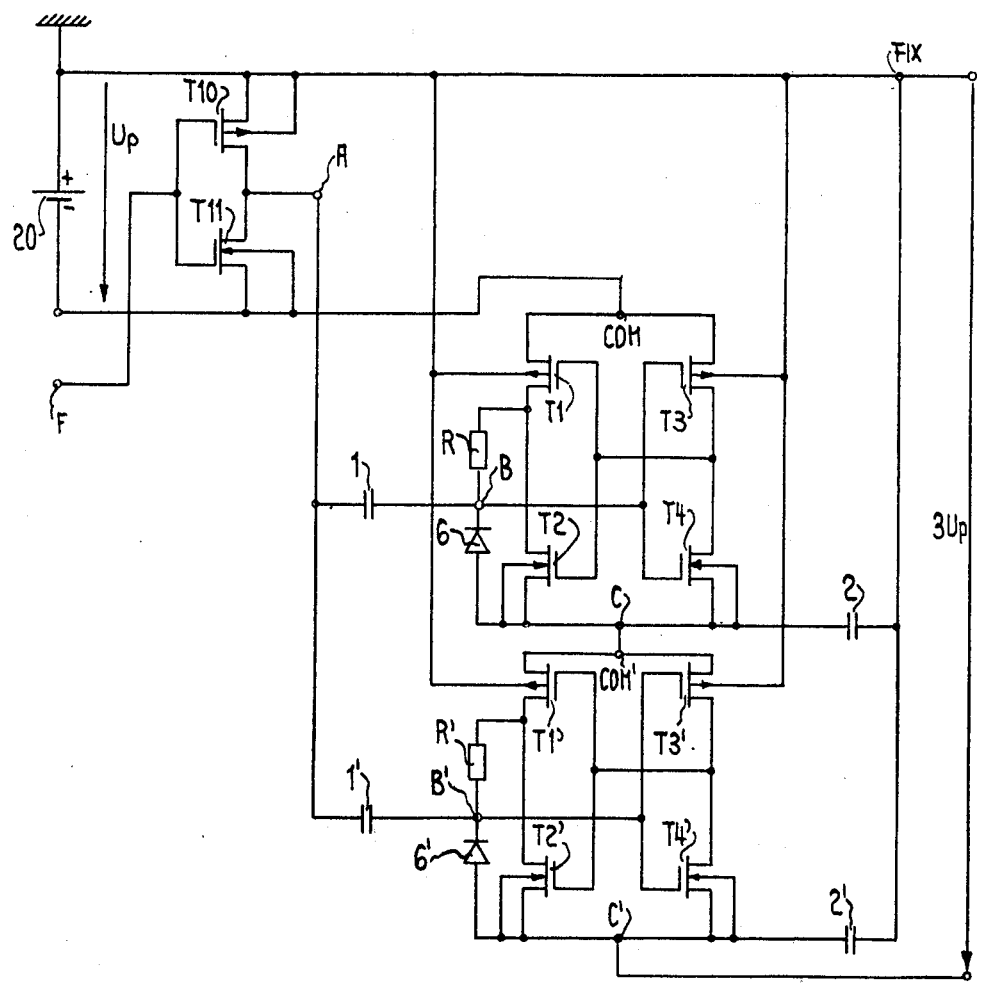
FIG. 9 is a diagram of a voltage multiplier in accordance with the present invention.

FIG. 1 shows a voltage converter using capacitors 1 to 4 and diodes 5 to 8. The particular connection of the capacitors and diodes enables a continuous voltage to be obtained at an output E which voltage has an amplitude greater than the amplitude of the pulses arriving at an input point A. FIGS. 2 to 6 show voltage waveforms $U_A$, $U_B$, $U_C$, $U_D$, and $U_E$ at the points A, B, C, D and E of the circuit of FIG. 1. The point COM is a reference point. At the input A of the circuit a series of pulses of amplitude $U_P$ are supplied and at the points B and D situated to the right of capacitors 1 and 3, respectively, rectangular signals appear having an amplitude $U_P$, displaced by a continuous voltage $U_P$ with respect to the preceding point. At the points C and E situated on the right of capacitors 2 and 4 continuous voltages appear the size of which is a whole multiple of the value $U_P$. The chain can be enlarged at will with cells formed by two capacitors and two diodes. This circuit however only has a real practical value when one can neglect the voltage drops across the diodes relative to the value $U_P$. In watches, the rectangular pulse signal has its amplitude limited by the feed voltage (battery voltage) which is in the region of 1.5 volts, whilst the voltage drop across a diode is of the order of 0.5 Volts, which is thus far from being negligible.

The diagrams of FIGS. 2 to 6 are only valid if the capacitors have capacitance values which are sufficiently high so that the charging and discharging currents to which they are subjected at the frequency of the input signal does not noticeably modify their state of charge and thus their voltage.

In this case the voltages at the points A, B and C are only distinguished from each other by their continuous levels. It is thus possible to connect in the capacitors 1 and 3 between the point A and the points B and D respectively. Similarly, the voltages at the points COM, C and E only differ by their continuous components and it is possible to connect their capacitors 2 and 4 between the point COM and the points C and E respectively. Since the point COM is at a constant voltage it is equally possible to connect the capacitors at any other point itself having a constant potential and only being displaced from the potential at point COM by a continuous component, in particular one or other terminal of the battery.

Considering the example of FIG. 1 and the first cell comprised of the capacitors 1 and 2 and diodes 5 and 6, the point C shows a continuous negative voltage of value $U_P$ with respect to the point COM. If the point COM is connected to the negative terminal of the battery, the point C shows a continuous negative voltage of value $2U_P$ with respect to the positive terminal of the battery (which is found to be generally the earth of the circuit). It is clear that one can reverse the polarity of the output voltage by changing the polarities of the diodes and by connecting the point COM to the positive terminal of the battery. On the other hand, it is not essential that the capacitor 2 be connected to the point COM, it can be connected to any point at all having a fixed voltage and a small impedance (FIX). During the positive half of the input signal $(U_A)$ the diode 5 conducts a current which charges the capacitor 1 (in FIG. 1, positive to the left, negative to the right). During the negative half (or zero), the capacitor 1 partially discharges across the diode 6, which charges the capacitor 2. After several cycles, if the capacitor 1 does not discharge too much, the potentials indicated in FIGS. 3 and 4 will have been attained. The voltage drops on the diodes will cause (voltage of battery: 1.5 Volts and a drop on the diodes: 0.5 Volts) a loss of more than 30% with respect to a theoretical value. To avoid this inconvenience, the diodes should be replaced by active elements controlled at the correct frequency.

In the active circuit of FIG. 7, the capacitors 1 and 2 remain, the diodes 5 and 6 of FIG. 1 on the other hand have been replaced by transistors T1 and T2 respectively. The transistor T1 must be conductive during the positive half of the input signal at A, whilst T2 must conduct during the negative half of the input signal $U_A$.

With regard to the voltages at the points B, C and COM, the transistor T1 must conduct when its source and its drain are found at the most positive voltage of the device. It is convenient thus to choose a p-channel field effect transistor (FET) for T1 because p-channel FET's conduct when their control electrodes are polarised negatively with respect to their two other electrodes. Thus one can work with the voltage levels available in the system, the voltage at the point C being sufficiently negative with respect to B and COM in the time interval considered. It is equally easy to block the transistor T1 with a potential corresponding to the point COM, no other electrode of T1 being connected to a more positive voltage, which ensures its blockage. A similar reasoning indicates that T2 is, preferably, an n-channel field effect transistor. It follows that the control electrodes of T1 and T2 can be controlled by the same signal, their complimentary character ensuring that conduction of only one transistor at a time. However, since the signal at the point B has correct voltage levels for controlling T1 and T2 but the incorrect phase, it is necessary to pass the signal through a reverser made with the complimentary transistors T3 and T4 for producing a control signal having the correct phase. This reverser must be fed by the levels of the points COM and C to function correctly.

Presuming that the input voltage at the point A passes from its most positive level to its most negative level, the transistor T1 will conduct until the voltage is sufficiently lowered so that the reverser T3, T4 changes state. From this moment only the transistor T1 will be blocked. Thus, the capacitor 1, which was charged, has a tendency to discharge, i.e. its charge will follow the input signal as long as the transistor T1 will conduct. In a similar manner, when the reverser switches over, the transistor T2 conducts and has a tendency to discharge the capacitor 2 into the capacitor 1, given that the voltage on the capacitor 2 is, at this moment, even greater than the sum of the input voltage and the voltage on the capacitor 1. Moreover, it is only when the input voltage has attained its ultimate most negative value that the transistor T2 should itself conduct. The problem is similar when the voltage at the input passes from its most negative level to its most positive level, the transistor T2 remains conductive too long and the transistor T1 starts to conduct too soon. The switching transistors T1 and T2 thus oppose the changing of the voltage controlled by the input. To palliate this inconvenience, the switching transistors T1, T2 are provided having small dimensions with respect to the transistors of the input stage (not shown) which furnishes the input signal $U_A$. The signal $U_A$ then maintains very rigid pulse edges, in spite of the charge which represents the transistors T1 and T2. The earlier mentioned phenomenon is then of a sufficiently short duration to be of no consequence. One can also, as can be seen in FIG. 7, put a resistance R between the point B and the transistors T1 and T2 to largely reduce the influence of the transistors T1 and T2 during the switching over.

It is also sought to resolve the problem posed by the polarisation of the substrate and the cases containing the field effect transistors forming the circuit. The field effect transistor has four inputs, namely: the three conventional electrodes: drain, source and gate, and an electrode contacting the substrate, or the case in which they are located. In the "C-MOS" (complimentary -MOS) technique both types of transistors are provided on the same substrate. As shown in FIG. 8, in the negatively doped sub-strate 10, there is provided a p-channel transistor by diffusing into this substrate two positively doped layers 11 and 12 adapted to form respectively the source and the drain and on the substrate between the two layers 11 and 12, an insulating layer of $SiO_2$ 13 is applied adapted to receive the control electrode of the transistor, i.e. the gate. To make an n-channel transistor, a positively doped region 14 is buried in the substrate 10 into which region 14 negatively doped layers 15 and 16 are diffused and an insulating layer 17 is applied which receive the drain, source and gate electrodes of the transistor. The negatively doped substrate 10 must be connected to a terminal having a voltage which is sufficiently positive with respect to the source and drain electrodes of the p-channel transistors. For the positively doped regions, their voltages must be sufficiently negative with respect to the respective electrodes of the n-channel transistors.

FIG. 9 shows a multiplier composed of two cells. There is shown the battery 20 with an indication of its polarity. There is also shown the final stage of the device controlling the converter and which is composed of two transistors T10, T11 forming a reverser fed by a signal F derived from a timer circuit. The transistors represented in this diagram include, additional to the three conventional electrodes, a fourth electrode which contacts either the substrate or the casing of the transistor. This electrode is shown with an arrow in the drawing, an ingoing arrow is indicative of an n-channel transistor, an outgoing arrow of a p-channel transistor. The substrate of all the p-channel transistors is connected to the positive terminal of the battery. The casings of the n-channel transistors are directly connected to the sources of their respective transistors. In effect, the substrate, common to all the p-channel transistors, must be placed at the most positive possible voltage, it is then easy to connect it to the positive terminal of the battery which, in this instance, is connected to earth for the whole circuit. For the casings of the n-channel transistors, each transistor can have its own casing if necessary and this must be at a sufficiently negative voltage with respect to the drain and source electrodes of the or each transistor which it houses. It suffices to connect the casing directly to the respective sources of the transistors. It is preferable not to connect all the casings to the most negative voltage of the circuit, as the threshold voltage of the n-channel transistors depends greatly on the polarisation of the casings, if this polarisation is too great, the threshold voltage increases uselessly. In the solution adopted and illustrated in FIG. 9, the polarisation of the casing being small, the threshold voltage becomes independent of the voltage level. Thus, the n-channel transistors are grouped in boxes which are just sufficiently polarised so that the source or drain are never negative with respect to the casing.

The first cell is composed of transistors T1, T2, T3, T4, a resistance R and two capacitors 1 and 2. It also includes a diode 6 connected between points C and B. The second cell is composed of transistors T1', T2', T3' and T4', a resistance R' and two capacitors 3 and 4, a diode 6' connected between points E (output) and D. The diodes 6 and 6' (similarly to FIG. 1) ensure a correct starting of the multiplier when the output voltage is nil.

The voltage of the battery being $U_P$, the output voltage is, theoretically, $3 U_P$. Two tables, shown below, give the results obtained with two types of multipliers, for different output currents and the following values:

frequency of control pulses: 250 Hz
voltage of battery $U_P = 2.5$ V.

| Doubling (a single cell) with Cl = C2 = 0,15 μF* | | |
|---|---|---|
| output voltage (V) | output current (μA) | yield (%) |
| 5 | 0 | 0 |
| 4,97 | 0,5 | 90 |
| 4,7 | 5 | 93 |

*Cl, C2 = value of the capacitors 1,2

| Quadrupling (three cells) with Cl = C2 = ... = 100 nF | | |
|---|---|---|
| output voltage (V) | output current (μA) | yield (%) |
| 9,7 | 0 | 0 |
| 9 | 0.1 | 75 |
| 8 | 1 | 78 |

In the first case, the stability and the yield are very high, in the second, the two characteristics depend obviously on the quality of the transistors used.

In so far as concerns the value of the frequency of the input pulses, it is to be noted that this is a compromise dictated by the dimensions of the capacitors on the one hand (preferring a high frequency) and the losses due to the stray capacitances (preferring a low frequency).

One can see that the choice of MOS transistors presents appreciable advantages: there is a compatibility between the multiplier and the "C-MOS" logic of the time circuit, the losses of voltage are negligible in view of the lack of "offset" voltage of the field effect transistors, the problems of dissipation of energy in the control of the transistors do not exist, being given that the input impedence of these transistors is almost infinite.

I claim:

1. A voltage multiplier for an electronic time apparatus comprising, at least one cell, including two complimentary field effect transistors, a first capacitor, said first capacitor transmitting an input signal to said two complimentary field effect transistors, said transistors transmitting the input signal alternatively to a common point of the cell and to an output terminal of the cell, a reverser, said transistors being controlled by said reverser, said reverser also being controlled by the signal transmitted to the transistors by said first capacitor and fed by voltages appearing at the common point and at the output terminal of the cell, a second capacitor being connected between the output terminal and a stable voltage point of the cell.

2. A multiplier in accordance with claim 1, in which the transistors of the multiplier are of small dimensions with respect to external transistors providing the input signal.

3. A multiplier in accordance with claim 1, in which a resistance is connected between the first capacitor and the two transistors of the cell.

4. A multiplier in accordance with claim 1, in which the stable voltage point of the cell is one of the terminals of a battery for supplying the time apparatus and the output voltage of the multiplier is taken between the output terminal of the cell and a terminal of the battery.

5. A multiplier in accordance with claim 1, in which several cells are connected in cascade, so that the common point of one cell is connected to the output terminal of the preceding cell, the inputs of each of the cells being common and the stable voltage points of each of the cells being common.

* * * * *